United States Patent
Stevens et al.

(10) Patent No.: US 7,302,479 B2
(45) Date of Patent: Nov. 27, 2007

(54) DYNAMIC CLIENT/SERVER SESSION RECOVERY IN A HETEROGENOUS COMPUTER NETWORK

(75) Inventors: Jeffrey S. Stevens, Endicott, NY (US); Paul F. Rieth, Apalachin, NY (US); Daniel L. Krissell, Kirkwood, NY (US); Richard G. Hartmann, Endicott, NY (US); Francine M. Orzel, Endicott, NY (US); Thomas E. Murphy, Jr., Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 10/202,319

(22) Filed: Jul. 23, 2002

(65) Prior Publication Data

US 2004/0019674 A1      Jan. 29, 2004

(51) Int. Cl.
G06F 15/16         (2006.01)
(52) U.S. Cl. .......................... 709/224; 714/57
(58) Field of Classification Search ................ 709/224; 714/57
See application file for complete search history.

(56) References Cited

U.S. PATENT DOCUMENTS

| | | | |
|---|---|---|---|
| 5,140,689 A | | 8/1992 | Kobayashi ................... 395/575 |
| 5,734,810 A | * | 3/1998 | Tanaka et al. .................. 714/4 |
| 6,006,331 A | | 12/1999 | Chu et al. |
| 6,018,805 A | * | 1/2000 | Ma et al. ........................ 714/4 |
| 6,049,892 A | * | 4/2000 | Casagrande et al. ........... 714/18 |
| 6,065,053 A | * | 5/2000 | Nouri et al. ................. 709/224 |
| 6,145,094 A | * | 11/2000 | Shirriff et al. ................. 714/11 |

OTHER PUBLICATIONS

T.Murphy et al. Jul. 2000, 5250 Telnet Enhancements , IBM Corporation.*
P. Chmielewski, "5250 Telnet Interface", Network Working Group Request for Comments: 1205, Feb. 1991.
S. Alexander, "Telnet Environment Option", Network Working Group Request for Comments: 1572, Jan. 1994.
T. Murphy, Jr., P. Rieth, J. Stevens, "5250 Telnet Enhancements", Network Working Group Request for Comments: 2877, Jul. 2000.

* cited by examiner

*Primary Examiner*—Jason Cardone
*Assistant Examiner*—Mitra Kianersi
(74) *Attorney, Agent, or Firm*—Roy W. Truelson (57) ABSTRACT

A method and system for establishing and maintaining a connection in a client/server environment is disclosed. A client requests a connection from a server, and the client and server negotiate environment options to establish the connection including a recovery location comprising, in one example, an IP address and port. The server stores the recovery location received from the client in a recovery information file. In response to losing the connection with the server, the client checks the recovery location for a recovery notification sent by the server. When the server is re-started, a recovery notification is sent by the server to the recovery location that was stored in the recovery information file. The client receives this recovery notification, and the connection between the client and the server is re-established without the need for the client to query the server.

29 Claims, 4 Drawing Sheets

DYNAMIC CLIENT/SERVER SESSION RECOVERY IN A HETEROGENOUS COMPUTER NETWORK

FIELD OF THE INVENTION

The invention relates to maintaining network connections between computer systems such as those used in a client/server computing environment. More particularly, the invention relates to the re-establishment of network connections between client and server systems subsequent to a server system becoming unavailable over a network.

BACKGROUND OF THE INVENTION

As is known, the use of client/server architecture has gained wide acceptance in the field of computing. This is due to its numerous advantages comprising the interoperability of heterogeneous systems, the ability to install applications or data on a server for use by numerous disparate clients, the ability of a server to interoperate with clients over a network that are disposed at geographically diverse locations, as well as the overall scalability and versatility of the architecture. From time to time, a server may become unavailable due to a variety of reasons comprising a system failure on the part of the server or scheduled maintenance. When a server suddenly and unexpectedly stops responding to a client over a network, the client has traditionally continued to poll the network by sending requests to the server and listening for a response in an attempt to re-establish contact with the server. If the server has experienced a failure or will be down for an extended period of time for some other reason, attempts by the client to re-establish contact with the server are futile and, in fact, waste valuable network bandwidth. In the case where there are numerous clients simultaneously attempting to re-establish contact with a given server that has gone down, futile and wasteful consumption of network bandwidth is exacerbated which can lead to overutilization and secondary failure of the network.

There is a need in the art to enable a client to re-establish a network connection to a server, subsequent to the server becoming unavailable over the network, more efficiently than client network polling for the server which has traditionally been done. The present invention provides the advantage of efficiently re-establishing a connection between a client and a server while minimizing wasted consumption of network bandwidth. There are several methods and apparatus for handling server system failures and re-establishing connections between client and server systems as described in the following U.S. Letters Patents:

| | |
|---|---|
| U.S. Pat. No. 5,140,689 | Kobayashi |
| U.S. Pat. No. 5,734,810 | Tanaka et al. |
| U.S. Pat. No. 6,018,805 | Ma et al. |
| U.S. Pat. No. 6,049,892 | Casagrande et al. |
| U.S. Pat. No. 6,065,053 | Nouri et al. |
| U.S. Pat. No. 6,145,094 | Shirriff et al. |

U.S. Pat. No. 5,140,689 describes a system and method whereby client/server workload processing is performed in two phases. A client requests that servers perform PHASE I processing. When all servers have completed PHASE I processing, the client stores information indicating this completion. If a server goes down and is subsequently restarted, the server first inquires with the client as to whether all servers have completed PHASE I processing. If completion of PHASE I processing is so indicated by the client, the server begins PHASE II processing. However, if the client indicates that not all servers have completed PHASE I processing, the server that went down performs rollback processing to PHASE I, and the client requests that servers which have completed PHASE I processing rollback to PHASE I processing.

U.S. Pat. No. 5,734,810 describes a system and method for reconnecting a server and a plurality of clients over a network subsequent to a shutdown of the server. The server sends shutdown forecast information to the clients subsequent to detection of a failure in the server, but prior to a shutdown of the server. Clients receiving the shutdown forecast information set a shutdown flag to "on", and thereafter repeatedly attempt to establish a network connection with the server. Once a network connection has been established, the shutdown flag is set to "off" and normal processing resumes. In an alternative embodiment, the shutdown forecast information includes a scheduled restoration time of the server and the clients wait until such time prior to attempting to establish a network connection with the server. The invention of the instant application obviates the need for the repeated client attempts to establish a network connection with a server described in U.S. Pat. No. 5,734,810.

U.S. Pat. No. 6,018,805 describes a distributed-object software application and method for recovering from a server crash. A software application comprises a client object resident on a client system and a server object resident on a server system. An intelligent proxy on the client system detects a server crash when no response is received from the server object. The intelligent proxy saves the state of the unresponsive server object and sends the name of the server object to a locator server which contains a directory of objects and the systems on which they are running. The locator server looks up the name of the unresponsive server object and sends a remote reference that points to another instance of the server object which is running on another server to the intelligent proxy. If no other running instance of the server object exists, the locator server creates an instance by loading the server object onto another server system and sending a remote reference that points to this instance to the intelligent proxy. The intelligent proxy uses the state information that was saved at the time of server crash detection to advance the state of the server object instance pointed to by the remote reference to the state that existed prior to the server crash. The server object instance pointed to by the remote reference is then used to process requests from the client object.

U.S. Pat. No. 6,049,892 describes a process for downloading a data file from a server computer to a client computer. A client program, specialized for performing downloads, may be stored on the server. Responsive to a request to download a file, the client program is downloaded to the client first. The client program may then be executed on the client to transfer the requested file from the server. The client program monitors the progress of the file transfer from the server and tracks the amount of data in the file that has been reliably received by the client. In the event of a download failure, the download is automatically restarted by the client program at a point in the file immediately after the data that has already been received thus obviating the need for re-transmission of data.

U.S. Pat. No. 6,065,053 describes a system for resetting a server computer from either a local or remote client computer. The server includes a microcontroller that is configured to reset the central processing unit of the server allowing the server to be restarted following, for example, an unexpected crash. The microcontroller is connected to a remote interface which is in turn connected to a local or remote client using a null-modem serial cable or a pair of modems, respectively. Using this series of connections, a local or remote client may reset a server, subsequent to which, the remote interface may communicate the results of the reset back to the local or remote client.

U.S. Pat. No. 6,145,094 describes a method and apparatus in a client/server environment for switching operations from a primary server to a secondary server in the event of a failure of the primary server. When an operation on the primary server acquires exclusive access to a shared resource, a message is sent to the secondary server indicating which operation has such exclusive access. The message is used to update state information at the secondary server so as to indicate that the operation on the primary server has exclusive access to the shared resource. Upon receiving notification that the primary server has failed, the secondary server acts as a new primary server. Having maintained state information with respect to the operation on the primary server having exclusive access to the shared resource, the secondary server acquires exclusive access to the shared resource and completes the operation in response to a re-try request from a client of the primary server to access the shared resource, thus providing a smooth transition from the primary server to the secondary server.

It is believed, therefore, than a system and method for enabling a client to re-establish a network connection with a server that provides the many advantages taught herein would constitute a significant advancement in the art.

OBJECTS AND SUMMARY OF THE INVENTION

It is a primary object of the present invention to enhance the art of client/server computer systems.

It is a more specific object of the invention to provide such a system in which the server notifies the client that it is again functioning following a server shutdown without requiring the client to query the server.

It is another object of the invention to provide such a system (and method) to minimize the consumption of network bandwidth subsequent to a server becoming unavailable over a network.

It is yet another object of the invention to provide a system (and method) to minimize the amount of network bandwidth utilized to re-establish a client network connection to a server.

In accordance with one embodiment of the invention, there is provided a client/server computer system comprising at least one server, and at least one client having a connection to and functioning with the at least one server, the at least one server notifying the at least one client when the at least one server begins functioning again following a cessation of functioning without requiring the at least one client to query the at least one server.

In accordance with another embodiment of the invention, there is provided a method for operating a client to establish and maintain a connection with a server comprising establishing a connection between the client and the server, the client providing to the server a recovery location to receive a recovery notification from the server after losing the connection with the server, and re-establishing the connection with the server in response to the recovery notification at the recovery location, the recovery notification being provided to the client without requiring the client to notify the server.

In accordance with yet another embodiment of the invention, there is provided a method for operating a server comprising receiving a request for a connection to the server from a client, receiving a recovery location at the server from the client, establishing the connection between the client and the server, and sending a recovery notification to the recovery location in response to the server functioning again following a cessation of functioning and re-establishing the connection with the client without requiring the client to query the server.

In accordance with yet another embodiment of the invention, there is provided a program storage device readable by a machine, tangibly embodying a program of instructions executable by the machine to perform method steps for operating a client and server computer system such that the server notifies the client when the server begins functioning following a cessation of the server functioning without requiring the client to query the server.

DETAILED DESCRIPTION OF THE INVENTION

For a better understanding of the present invention, together with other and further objects, advantages and capabilities thereof, reference is made to the following disclosure and appended claims in connection with the above described drawings.

It is understood that like numerals will be used to indicate like elements from FIG. to FIG. in the drawings which are described hereinbelow.

Figure 1:
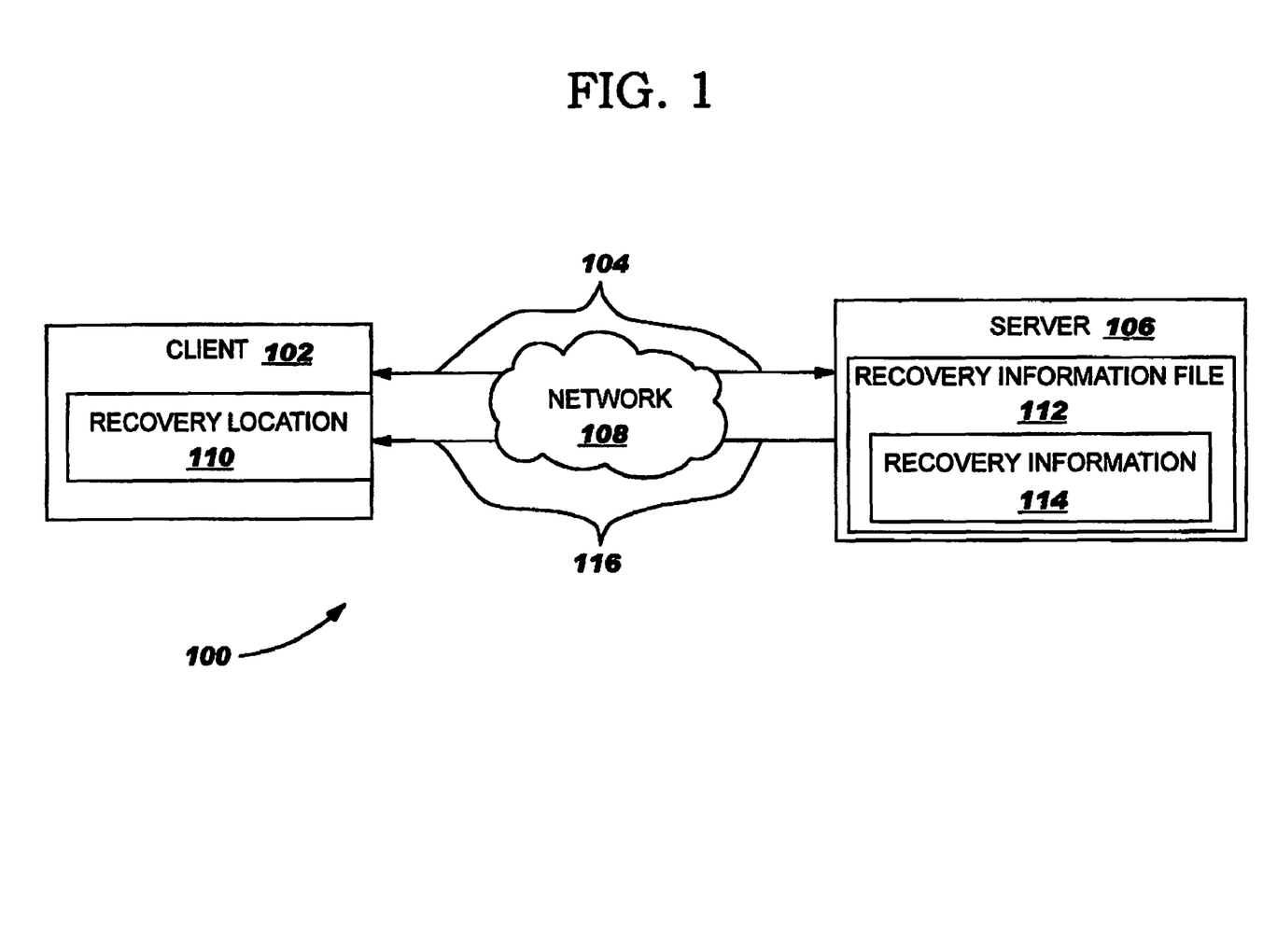
FIG. 1 is a schematic view illustrating a client/server system according to one embodiment of the invention.

Referring to FIG. 1, there is shown an embodiment of a client/server system 100 according to one aspect of the invention. At least one client 102, in one example a Telnet client, may establish connection 104 to at least one server 106, in one example a Telnet server, using network 108, in one example a TCP/IP network, and begin functioning with the server. Establishment of connection 104 using network 108 is described in further detail hereinbelow with reference to FIGS. 2A, 2B and 3.

Client 102 may provide recovery location 110, in one example an IP address and port at client 102, to server 106 during establishment of connection 104. Server 106 may store recovery location 110 in recovery information file 112 as recovery information 114. However, recovery information 114 may also include additional information, for example, application and system state information, which server 106 may also store in recovery information file 112.

In the event that connection 104 has been established, and client 102 subsequently loses connection 104 to server 106, client 102 may check recovery location 110 for recovery notification 116 sent by server 106. In one example, recovery notification 116 may comprise a signal sent to recovery location 110 indicating that server 106 has recovered, and connection 104 may be re-established.

When server 106 is started and begins functioning again following a cessation of functioning, in one example being re-booted, server 106 reads recovery information 114 in recovery information file 112, obtains recovery location 110 from recovery information 114, and notifies client 102 by sending recovery notification 116 to recovery location 110. Accordingly, client 102 receives recovery notification 116 at recovery location 110, and connection 104 between client 102 and server 106 may be re-established. Thus, connection 104 may be re-established without requiring client 102 to query server 106 using network polling.

Figure 2A:
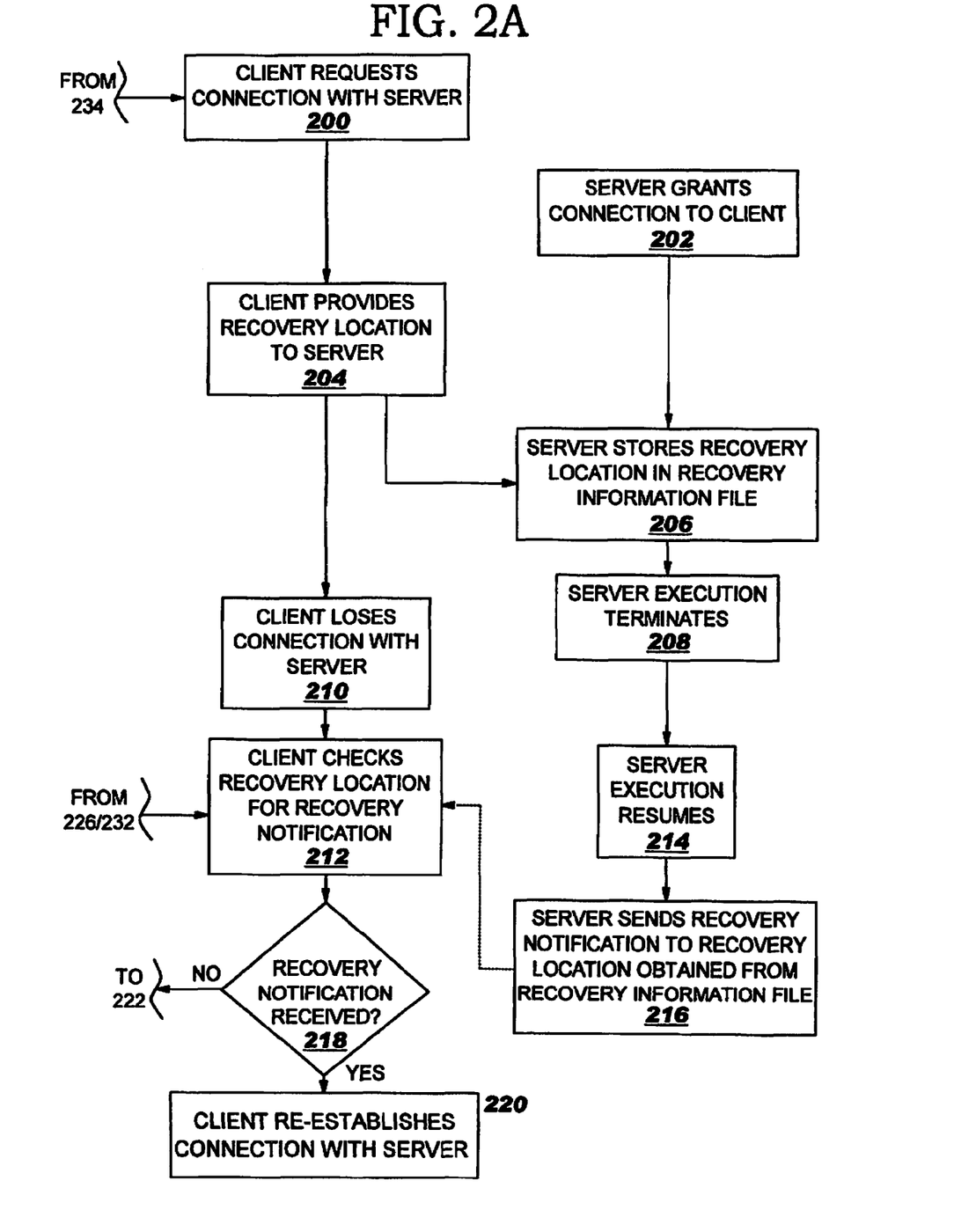
FIGS. 2A and 2B are a flow diagram illustrating a client/server connection recovery according to one embodiment of the invention.
Figure 2B:
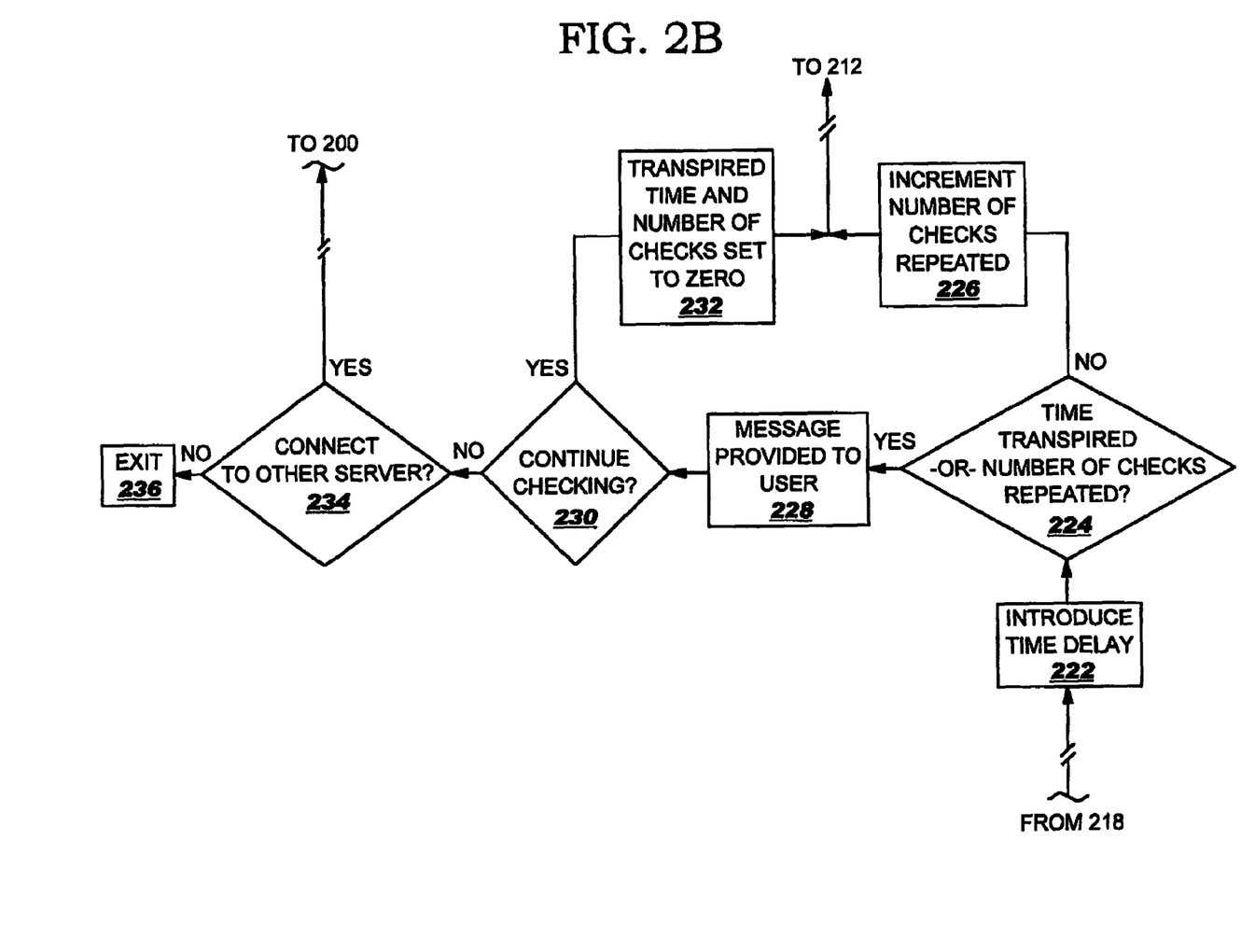

Referring to FIGS. 2A and 2B, exemplary client/server connection recovery method steps are shown. In the description hereinbelow, elements 102 through 116 are shown in FIG. 1.

In step 200, client 102 requests a connection, in one example connection 104, with a server, in one example server 106, and server 106 grants connection 104 to client 102 in step 202. When initially granted, connection 104 is, in one example, a generic TCP/IP connection, however, connection 104 may then be used to negotiate environment options that configure and ultimately establish connection 104 as a Telnet connection. During environment options negotiations associated with connection 104, and described hereinbelow with reference to FIG. 3, client 102 provides recovery location 110 to server 106 as an environment option in step 204 as shown by a dashed line between steps 204 and 206. Server 106 stores recovery location 110 in recovery information file 112 as recovery information 114 in step 206. As described hereinabove, recovery information 114 may also include additional information, for example, application and system state information.

In step 208, server 106 execution terminates. Such a termination may occur for a variety of reasons comprising hardware failure, operating system software failure, scheduled preventative maintenance, system upgrade(s) that require a shutdown and re-boot or a combination of the foregoing. Irrespective of the reason(s) for server 106 execution termination, a result of the termination is that client 102 loses connection 104 with server 106 in step 210. It may be assumed that client 102 has lost connection 104 with server 106 when client 102 has not received a response to a query sent to server 106 within a period of time in which a response could be reasonably expected, in one example 10 seconds. Such a period of time is beyond that which typically may be caused by network propagation delays, poor network performance, etc.

In response to losing connection 104 with server 106, client 102 checks recovery location 110 for recovery notification 116 in step 212, and if recovery location 110 has not previously been checked for recovery notification 116 in response to losing connection 104, time transpired and number of checks repeated are set to zero (0). Server 106 is started, in one example re-booted, and server 106 execution resumes in step 214. In response to being started, server 106 reads recovery information 114 in recovery information file 112, obtains recovery location 110 from recovery information 114, and sends recovery notification 116 to recovery location 110 in step 216 as shown by a dashed line between steps 216 and 212. If recovery information 114 includes application and system state information, server 106 may use this information to restore the state(s) of operating system(s) and application(s) on server 106 to that which existed prior to execution termination.

In step 218, a determination is made as to whether or not recovery notification 116 has been received at recovery location 110. If recovery notification 116 has been received, client 102 re-establishes connection 104 with server 106 in step 220. If recovery notification 116 has not been received, further steps are performed as described hereinbelow with reference to FIG. 2B.

A time delay is introduced in step 222 (FIG. 2B) such that checking of recovery location 110 for recovery notification 116 is repeated at a pre-determined time interval, in one example a half-second.

In step 224, a determination is made as to whether or not a pre-determined period of time has transpired, in one example a minute, during which checking of recovery location 110 for recovery notification 116 is to be repeated, or checking of recovery location 110 for recovery notification 116 has been repeated a pre-determined number of times, in one example 120 times. If the pre-determined period of time has not transpired, or checking has not been repeated the pre-determined number of times, number of checks repeated is incremented by one (1) in step 226, and client 102 again checks recovery location 110 for recovery notification 116 in step 212 shown in FIG. 2A. If the pre-determined period of time has transpired, or checking has been repeated the pre-determined number of times, a message is provided to a user of client 102, in step 228. In one example, the message notifies the user that recovery notification 116 has not been received at recovery location 110.

Authorization is requested from the user to continue or discontinue checking recovery location 110 for recovery notification 116 in step 230. If the user indicates that checking is to be continued, time transpired and number of checks repeated are set to zero (0) in step 232, and client 102 continues to check recovery location 110 for recovery notification 116 in step 212 shown in FIG. 2A. If the user indicates that checking is to be discontinued, authorization is requested from the user to request a connection to another server in step 234. If the user indicates that another connection to a server is to be requested, client 102 requests a connection with a server in step 200 shown in FIG. 2A. If the user indicates that another connection to a server should not be requested, recovery method steps are exited in step 236.

Figure 3:
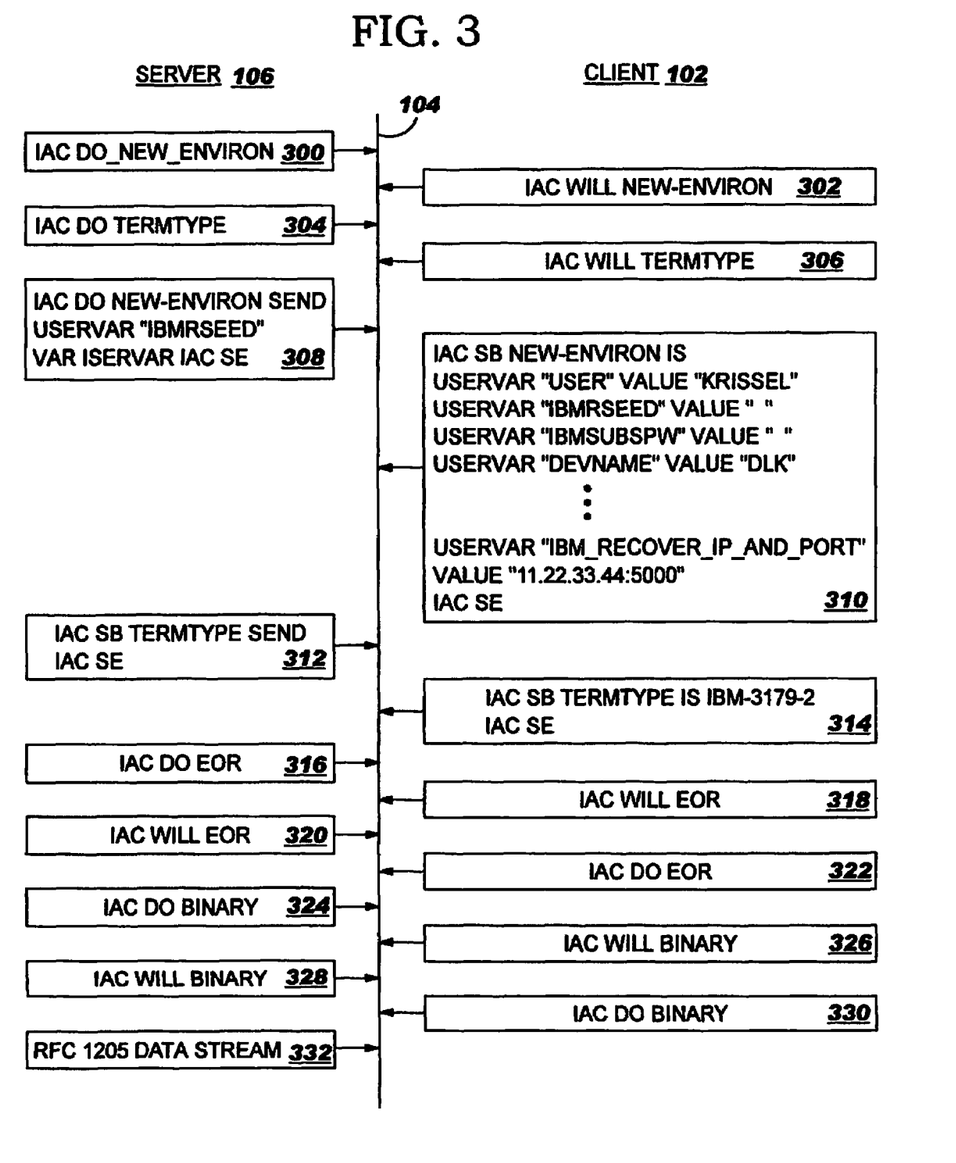
FIG. 3 is a flow diagram illustrating client/server Telnet session negotiations according to one embodiment of the invention.

Referring now to FIG. 3, method steps of exemplary negotiations of environment options including a recovery location are shown.

These negotiations are conducted in accordance with procedures described in S. Alexander, "Telnet Environment Option", Network Working Group Request for Comments: 1572, January 1994 (hereinafter referred to as "RFC 1572"). Further enhancements to Telnet environment negotiations are described in T. Murphy, Jr., P. Rieth, J. Stevens, "5250 Telnet Enhancements", Network Working Group Request for Comments: 2877, July 2000, the teachings of which are incorporated herein by reference.

Although Telnet Environment Options Negotiations are described in RFC 1572 cited hereinabove, a brief synopsis of these negotiations is presented hereinbelow to enhance the readability and understanding of the appended disclosure.

Telnet Environment Options Negotiations are a method for a plurality of entities, in one example a client and a server, to negotiate options (i.e. environment and configuration information) relating to a Telnet connection between these entities. Commands for negotiating Telnet Environment Options comprise: WILL, WONT, DO and DONT. WILL and WONT express a willingness and refusal, respectively, to perform an option being negotiated. DO and DONT express a request that the other entity perform or stop performing, respectively, an option. A Telnet command comprises at least the following two byte sequence: an Interpret As Command (IAC) escape character followed by a code for a given command. More detailed negotiations between entities are known as "Sub-negotiations", which utilize a Sub-negotiation Begin (SB) command, followed by an option code, followed by option parameters or values, which are followed by a Sub-negotiation End (SE) command.

In step 300, server 106 extends an invitation to client 102 to engage in new environment negotiations, and in step 302, client 102 accepts the invitation.

In step 304, server 106 opens negotiations for a terminal type, which client 102 accepts in step 306.

Server 106 requests that client 102 send a plurality of environment options in step 308. In accordance with a preferred embodiment of the invention, client 102 responds by providing, inter alia, recovery location 110 using the text "USERVAR 'IBM_RECOVER_IP_AND_PORT' VALUE '11.22.33.44:5000'" to server 106 in step 310. In the example hereinabove, IBM_RECOVER_IP_AND_PORT is an environment variable, and 11.22.33.44:5000 is the value associated with this variable. 11.22.33.44 is an exemplary IP address, and 5000 is an exemplary port number. Server 106 may then store recovery location 110 in recovery information file 112 as recovery information 114, as shown in FIG. 1.

In step 312, server 106 sends a sub-negotiation command "SB TERMTYPE SEND" requesting terminal type information.

Client 102 responds to the sub-negotiation terminal type command of step 312 by sending a valid supported terminal type, in one example, "SB TERMTYPE IS IBM-3197-2 IAC SE" in step 314.

Negotiations continue for such additional environment options as End of Record (hereinafter referred to as "EOR") and BINARY, and in step 316 server 106 requests that client 102 include EOR markers on data packets sent to server 106. Client 102 confirms that EOR markers will be included on data packets sent to server 106 in step 318. In anticipation of client 102 requesting that server 106 include EOR markers on data packets sent to client 102, server 106 confirms that EOR markers will be included on data packets sent to client 102 in step 320. Accordingly, in step 322 client 102 requests that server 106 include EOR markers on data packets sent to client 102, as was anticipated by server 106 in step 320.

In step 324, server 106 requests that client 102 send data packets to server 106 in a BINARY format (i.e. with no conversion or translation performed thereon). Client 102 confirms that data packets will be sent to server 106 in a BINARY format in step 326. In anticipation of client 102 requesting that server 106 send data packets to client 102 in a BINARY format, server 106 confirms that data packets will be sent to client 102 in a BINARY format in step 328. Accordingly, in step 330 client 102 requests that server 106 send data packets to client 102 in a BINARY format, as was anticipated by server 106 in step 328.

In step 332, environment options negotiations having been successfully completed, connection 104 is established as a Telnet connection and implemented, in one example, using an RFC 1205 data stream as described in P. Chmielewski, "5250 Telnet Interface", Network Working Group Request for Comments: 1205, February 1991, the teachings of which are incorporated herein by reference.

In Table 1 hereinbelow, an expanded example is presented of environment options negotiations similar to those of FIG. 3. As shown, clear text is followed by a corresponding hex representation. For example, in line 2 'FFFD27' is a hex representation of line 1 'IAC DO NEW-ENVIRON', lines 12-13 are a hex representation of lines 9-11, and lines 25-34 are a hex representation of lines 14-23 which includes a recovery location specified in lines 22-23 using text 'USERVAR "IBM_RECOVER_IP_AND_PORT" VALUE "11.22.33.44:5000"'.

TABLE 1

TN5250E Environment Options Negotiations

| | Telnet Server | | Telnet Client |
|---|---|---|---|
| 1 | IAC DO NEW-ENVIRON | -> | |
| 2 | FFFD27 | | |
| 3 | | <- | IAC WILL NEW-ENVIRON |
| 4 | | | FFFB27 |
| 5 | IAC DO TERMTYPE | -> | |
| 6 | FFFD18 | | |
| 7 | | <- | IAC WILL TERMTYPE |
| 8 | | | FFFB18 |
| 9 | IAC SB NEW-ENVIRON SEND | | |
| 10 | USERVAR "IBMRSEEDxxxxxxxx" | | |
| 11 | VAR USERVAR IAC SE | -> | |
| 12 | FFFA2701 0349424D 52534545 447D68B9 | | |
| 13 | 2BE04E04 040003FF F0 | | |
| 14 | | | IAC SB NEW-ENVIRON IS |
| 15 | | | USERVAR "USER" VALUE "KRISSELL" |
| 16 | | | USERVAR "IBMRSEED" VALUE " " |
| 17 | | | USERVAR "IBMSUBSPW" VALUE " " |
| 18 | | | USERVAR "DEVNAME" VALUE "DLK" |
| 19 | | | USERVAR "CODEPAGE" VALUE "37" |
| 20 | | | USERVAR "CHARSET" VALUE "697" |
| 21 | | | USERVAR "KBDTYPE" VALUE "USB" |
| 22 | | | USERVAR "IBM_RECOVER_IP_AND_PORT" |
| 23 | VALUE "11.22.33.44:5000" | | |
| 24 | | <- | IAC SE |
| 25 | | | FFFA2700 00555345 52014B52 49535345 |
| 26 | | | 4C4G0349 424D5253 45454401 04696CD0 |
| 27 | | | D7G41F81 0349424D 53554253 50570131 |
| 28 | | | 96A30203 3F5321FD 03444556 4E414D45 |

TABLE 1-continued

TN5250E Environment Options Negotiations

| Telnet Server | | Telnet Client |
|---|---|---|
| 29 | | 01444C4B 03434F44 45504147 45013337 |
| 30 | | 03434841 52534554 01363937 034B4244 |
| 31 | | 54595045 01555303 4942405F 5245434F |
| 32 | | 5645525F 49505F41 4E445F50 4F525401 |
| 33 | | 31312E32 322E3333 2E34343A 35303030 |
| 34 | | FFF0 |
| 35 | | |
| 36 IAC SB TERMTYPE SEND | | |
| 37 IAC SE | -> | |
| 38 FFFA1801 FFF0 | | |
| 39 | <- | IAC SB TERMTYPE IS IBM-3179-2 IAC SE |
| 40 | | FFFA1800 49424D2D 33313739 2D32FFF0 |
| 41 IAC DO EOR | -> | |
| 42 FFFD19 | | |
| 43 | <- | IAC WILL EOR |
| 44 | | FFFB19 |
| 45 IAC WILL EOR | -> | |
| 46 FFFB19 | | |
| 47 | <- | IAC DO EOR |
| 48 | | FFFD19 |
| 49 IAC DO BINARY | -> | |
| 50 FFFD00 | | |
| 51 | <- | IAC WILL BINARY |
| 52 | | FFFB00 |
| 53 IAC WILL BINARY | -> | |
| 54 FFFB00 | | |
| 55 | <- | IAC DO BINARY |
| 56 | | FFFD00 |
| 57 RFC 1205 Data Stream | -> | |
| 58 001112A0 00000400 000304F3 0005D970 | | |
| 59 00FFEF | | |

While there have been shown and described what are at present the preferred embodiments of the invention, it will be obvious to those skilled in the art that various changes and modifications may be made therein without departing from the scope of the invention as defined by the appended claims.

What is claimed is:

1. A client/server computer system, comprising:
   at least one server; and
   at least one client which establishes a connection across a network to and functions with said at least one server,
   wherein, responsive to losing an established connection with said server, said at least one client waits for a recovery notification from said at least one server without transmitting a request across said network to re-establish the connection; and
   wherein, responsive to resuming functioning of said at least one server following a cessation of functioning of said at least one server which causes loss of said established connection, said at least one server transmits a recovery notification across said network to said at least one client, said recovery notification being transmitted without requiring said at least one client to first send a communication to said at least one server following losing said established connection; and
   wherein said at least one client re-establishes said established connection with said at least one server responsive to receiving said recovery notification;
   further comprising a recovery location at said at least one client for receiving said recovery notification from said at least one server.

2. The system of claim 1, wherein said recovery notification comprises a signal sent to said recovery location by said at least one server.

3. The system of claim 1, further comprising a recovery information file at said at least one server for storing said recovery location as recovery information.

4. The system of claim 3 wherein said recovery information further comprises application and system state information.

5. The system of claim 3, wherein said recovery location comprise an IP address and port.

6. The system of claim 1, further including environment options negotiations for passing environment options between said at least one client and said at least one server to establish said connection.

7. The system of claim 6, wherein said environment options include said recovery location.

8. The system of claim 1, wherein said at least one client comprises a Telnet client and said at least one server comprises a Telnet server.

9. The system of claim 1, wherein said connection comprises a Telnet connection on a TCP/IP network.

10. A method for operating a client to establish and maintain a connection with a server, said method comprising:
   establishing a connection across a network between said client and said server;
   said client providing to said server a recovery location in said client to receive a recovery notification from said server after losing said connection with said server;

responsive to losing said connection, waiting in said client for a recovery notification without transmitting a request across said network to reestablish said connection;

receiving a recovery notification at said recovery location in said client, said recovery notification being received across said network from said server, said recovery notification being provided to said client without requiring said client to notify said server; and responsive to receiving said recovery notification, re-establishing said connection with said server.

11. The method of claim 10, wherein said step of waiting in said client for a recovery notification further comprises said client checking said recovery location for said recovery notification, said checking being repeated at a pre-determined time interval.

12. The method of claim 11, wherein said checking is repeated until a pre-determined period of time has transpired.

13. The method of claim 12, further comprising providing a message to a user of said client in response to said pre-determined period of time transpiring.

14. The method of claim 13, wherein said message notifies said user that said recovery notification has not been received at said recovery location.

15. The method of claim 14, further comprising requesting authorization from said user to continue checking said recovery location for said recovery notification.

16. The method of claim 14, further comprising requesting authorization from said user to discontinue checking said recovery location for said recovery notification.

17. The method of claim 16, further comprising requesting authorization from said user to request another connection to a server.

18. The method of claim 11, wherein said checking is repeated a pre-determined number of times.

19. The method of claim 18, further comprising providing a message to a user of said client in response to said checking being repeated said pre-determined number of times.

20. The method of claim 19, wherein said message notifies said user that said recovery notification has not been received at said recovery location.

21. The method of claim 20, further comprising requesting authorization from said user to continue checking said recovery location for said recovery notification.

22. The method of claim 20, further comprising requesting authorization from said user to discontinue checking said recovery location for said recovery notification.

23. The method of claim 22, further comprising requesting authorization from said user to request a connection to another server.

24. The method of claim 10, wherein said connection is established using environment options negotiations between said client and said server.

25. The method of claim 24, wherein said client provides said recovery location to said server as an environment option during said environment options negotiations.

26. A method for operating a server, said method comprising:

receiving a request for a connection to said server, said request being received from a client across a network;

receiving a designation of a recovery location, said designation of a recovery location being received at said server across said network from said client, said recovery location being in said client;

establishing said connection across said network between said client and said server;

resuming functioning of said server following a cessation of functioning of said server; and responsive to resuming functioning of said server, sending a recovery notification across said network to said recovery location in said client to re-establish said connection with said client, said recovery notification being sent by said server without requiring said client to first send a communication to said server following said cessation of functioning of said server.

27. The method of claim 26, further comprising storing said recovery location in a recovery information file as recovery information.

28. The method of claim 26, wherein said connection is established using environment options negotiations between said client and said server.

29. The method of claim 28, wherein said client provides said recovery location to said server as an environment option during said environment options negotiations.

* * * * *